J. V. KARR.
Non Explosive Gas Chamber and Valve.
No. 65,490. Patented June 4, 1867.
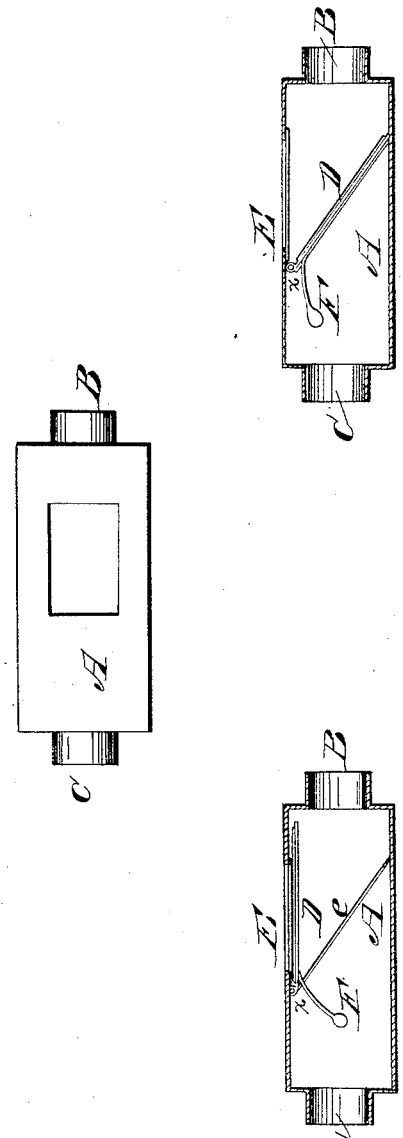

United States Patent Office.

JOHN V. KARR, OF GOSHEN, INDIANA.

Letters Patent No. 65,490, dated June 4, 1867.

---

IMPROVED GAS-CHAMBER AND VALVE FOR FORGES.

---

The Schedule referred to in these Letters Patent and making part of the same.

---

TO ALL WHOM IT MAY CONCERN:

Be it known that I, JOHN V. KARR, of Goshen, in the county of Elkhart, and in the State of Indiana, have invented a certain new and useful Non-Explosive Gas-Chamber and Valve; and do hereby declare that the following is a full, clear, and exact description thereof, reference being had to the accompanying drawings, and to the letters of reference marked thereon.

In the annexed drawings, making part of this specification, A represents a metallic box, which is provided at one end with an inlet pipe, C, and an outlet pipe, B, and at its top or upper side with an opening, E. D represents a valve, which is hinged on the inside of the top of the box at X so as to cover the opening E when it is raised. This valve is provided with a small weight, F, which is connected to it by a stem to assist in bearing said valve up to close the opening E. When the valve drops its loose end, said valve lies against ways, which are made for it to rest upon on the sides of the box. e represents one of the ways. This box, with its valve, is intended to transmit air to a blacksmith's fire or other fire through a pipe to a blow pipe. When the air is forced in at pipe C it raises the valve D and passes out at pipe B to the blow pipe. When the forcing-pump or bellows is stopped, the valve falls and the gas, instead of passing back to the fire, escapes through opening E. The valve, as well as its opening, are both lined or packed with any suitable material so as to make a tight joint either when the valve is open or closed. The lining or packing is placed around the mouth of the opening E in one case, and upon the under side of the valve in the other. When the valve is down, its packing on its under side makes a tight joint with the ways, on which it ties.

Having thus fully described my invention, what I claim as new, and desire to secure by Letters Patent, is—

The box A, made of any suitable shape, and provided with an inlet and outlet pipe, and an opening, E, when used with the valve D, constructed and applied as and for the purpose specified.

In testimony that I claim the foregoing I have hereunto set my hand this 5th day of March, 1867.

JOHN V. KARR.

Witnesses:
W. W. CRANDALL,
E. L. MOWRY.